Figure 20:
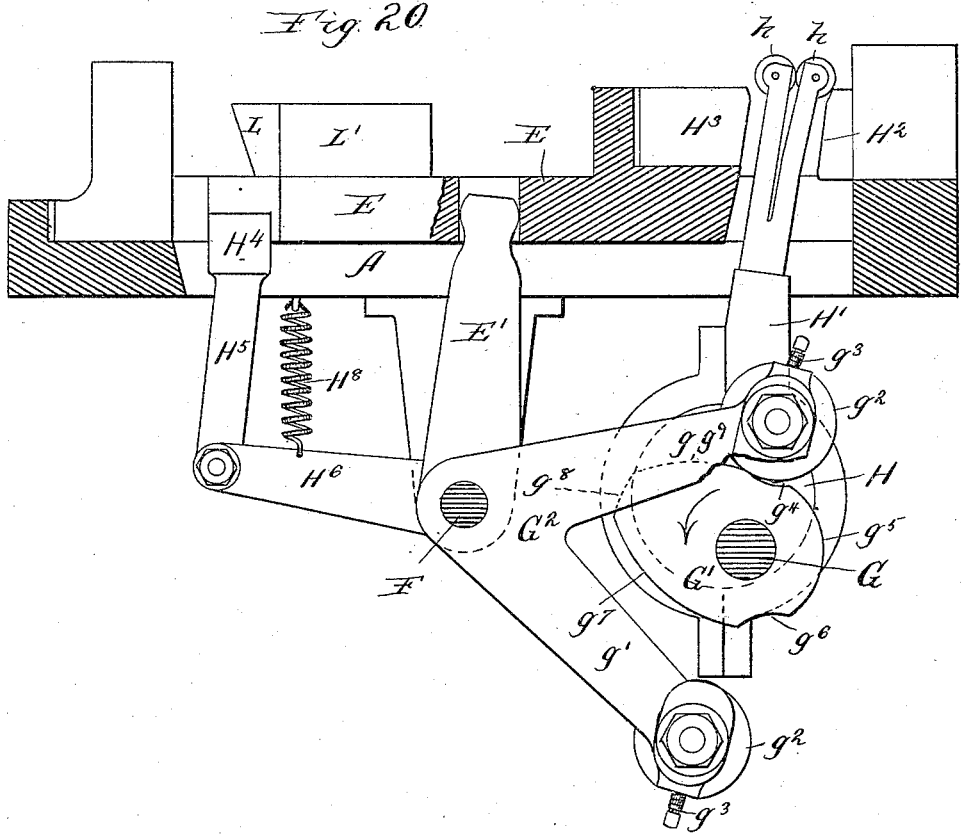

(No Model.) 7 Sheets—Sheet 1.
A. HOLMQUIST.
HORSE NAIL FINISHING MACHINE.
No. 430,736. Patented June 24, 1890.
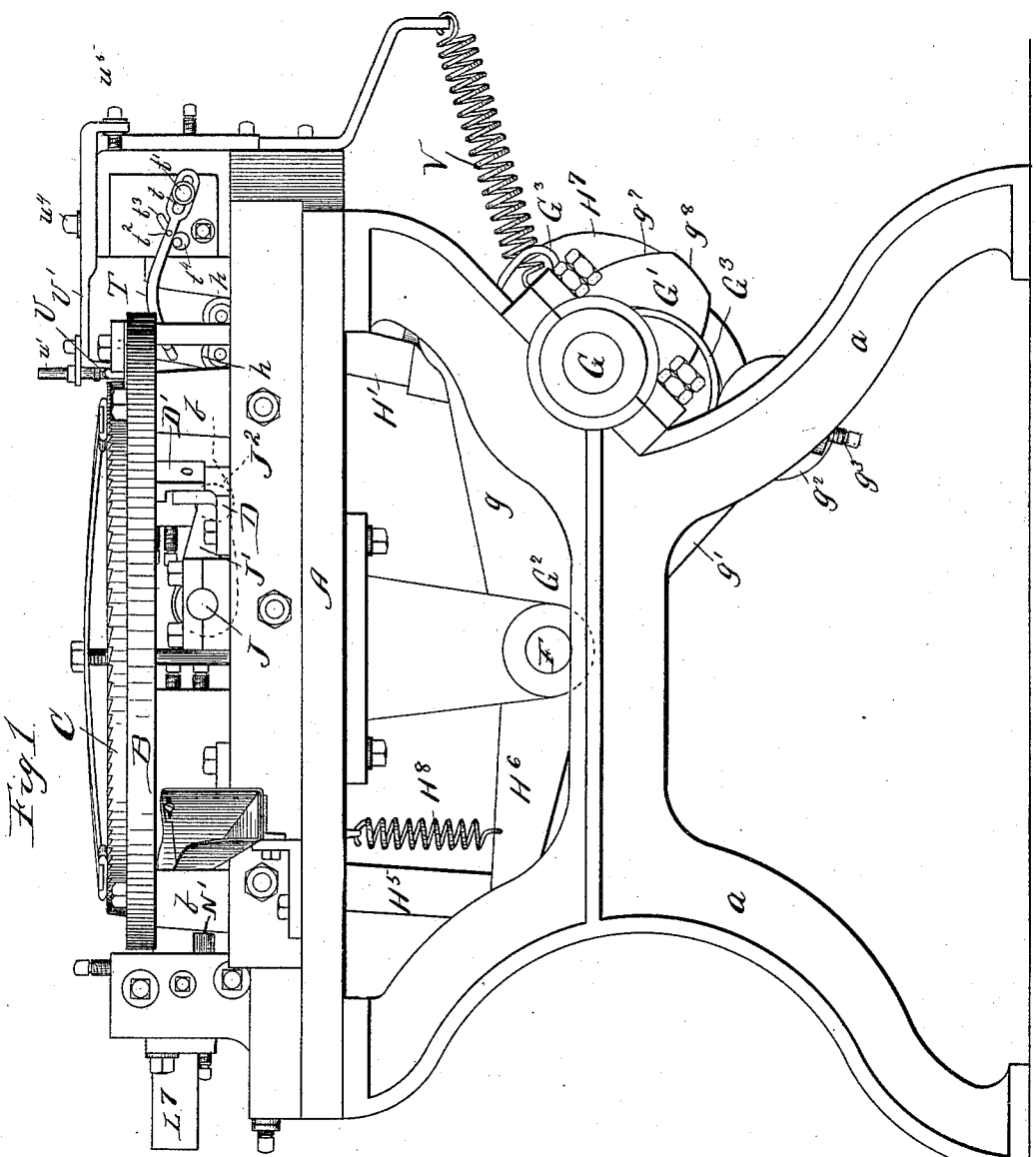
Witnesses.
Lew. E. Curtis
Emma Stack
Inventor:
August Holmquist.
By Munday Evarts & Adcock
His Attorneys.

(No Model.) 7 Sheets—Sheet 2.
A. HOLMQUIST.
HORSE NAIL FINISHING MACHINE.
No. 430,736. Patented June 24, 1890.
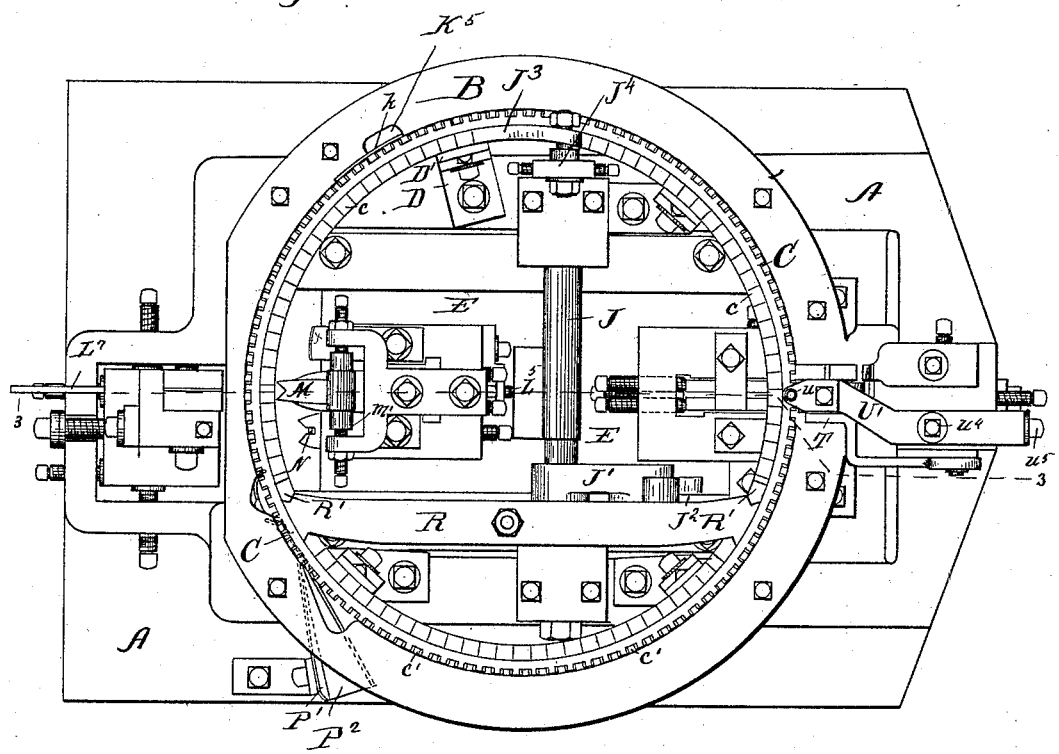

(No Model.) 7 Sheets—Sheet 3.
A. HOLMQUIST.
HORSE NAIL FINISHING MACHINE.
No. 430,736. Patented June 24, 1890.
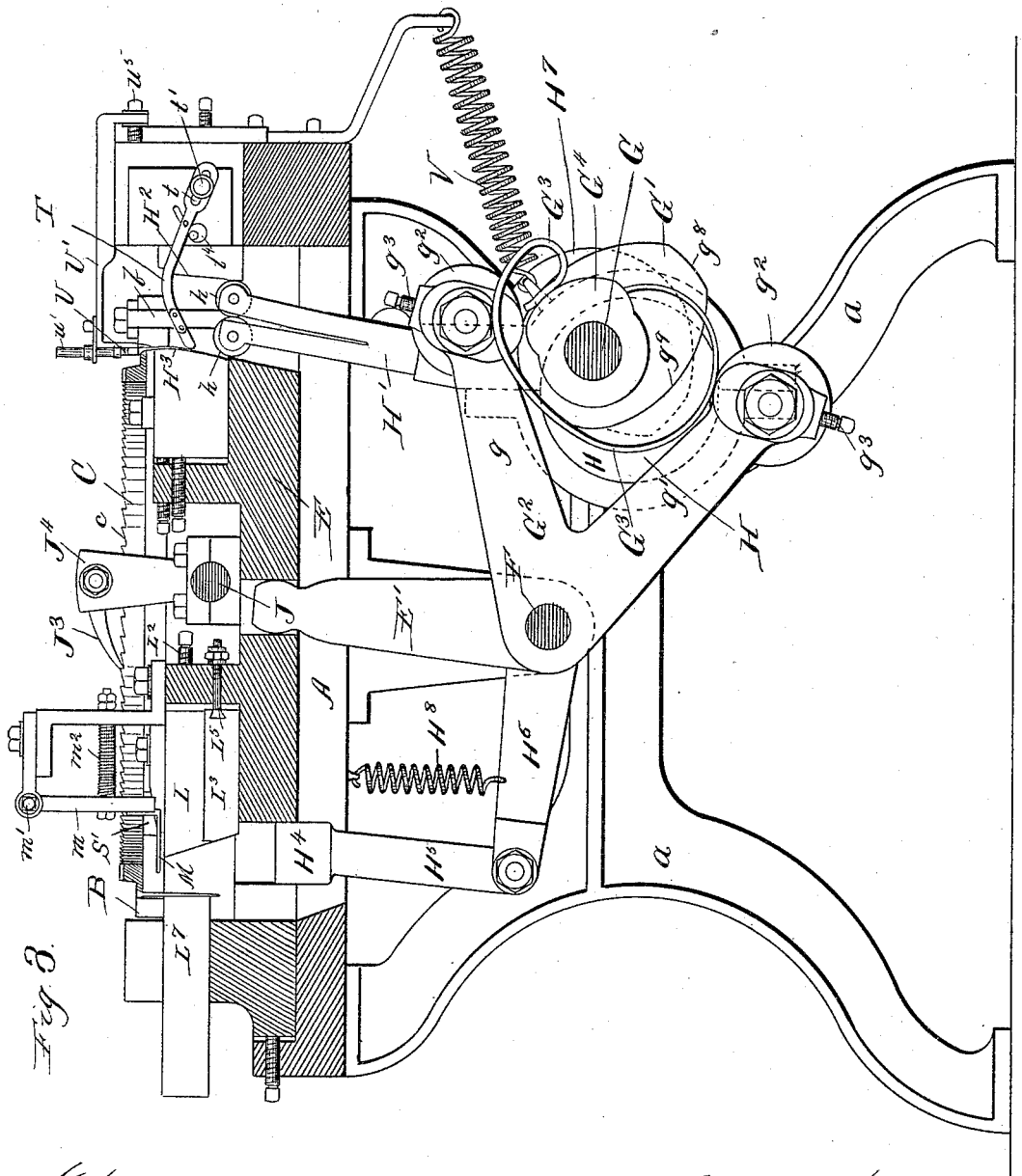
Witnesses:
Geo. E. Curtis.
Emma Hack
Inventor:
August Holmquist
By Munday Evarts & Adcock
His Attorneys.

(No Model.) 7 Sheets—Sheet 4.
A. HOLMQUIST.
HORSE NAIL FINISHING MACHINE.
No. 430,736. Patented June 24, 1890.
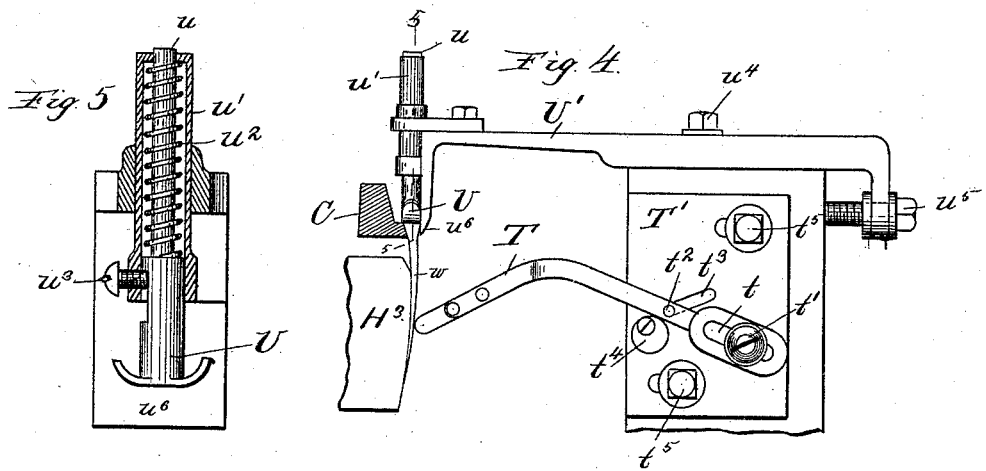
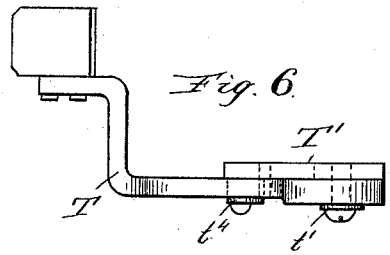
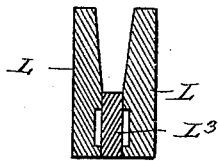
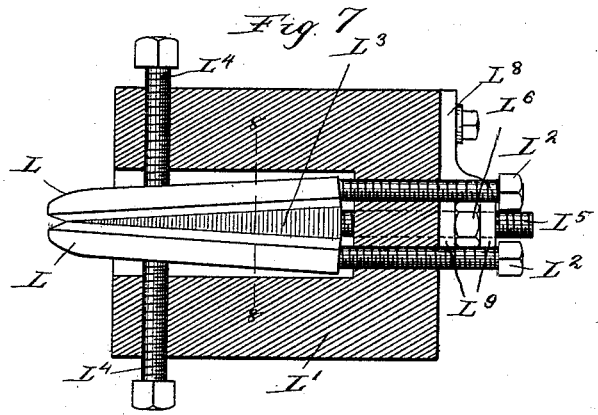
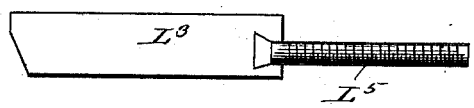
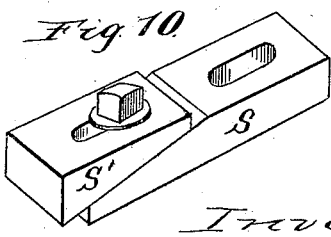
Witnesses:
Lew. E. Curtis
Emma Hack
Inventor:
August Holmquist
By Munday Evarts & Adcock
His Attorneys (No Model.) 7 Sheets—Sheet 5.
A. HOLMQUIST.
HORSE NAIL FINISHING MACHINE.
No. 430,736. Patented June 24, 1890.
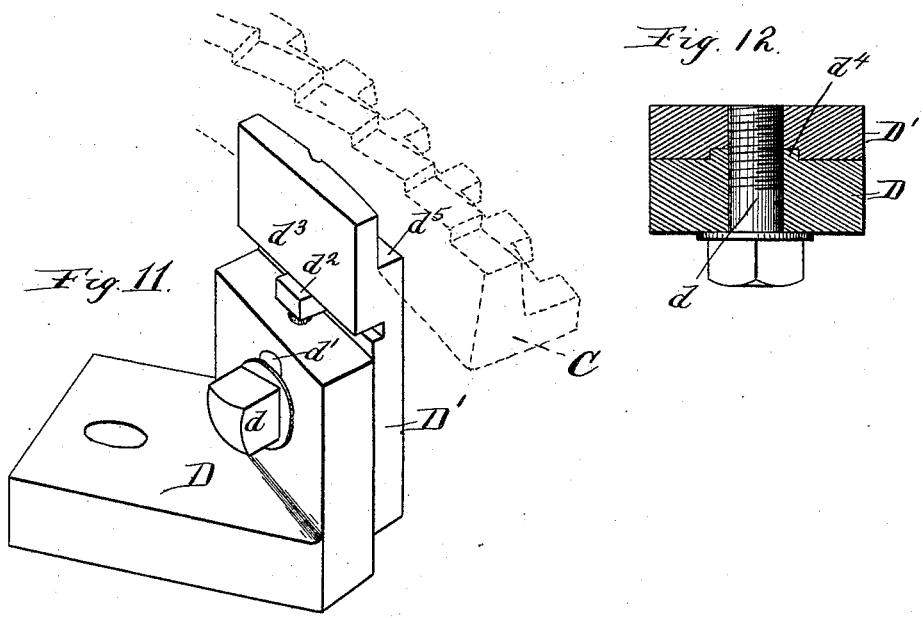
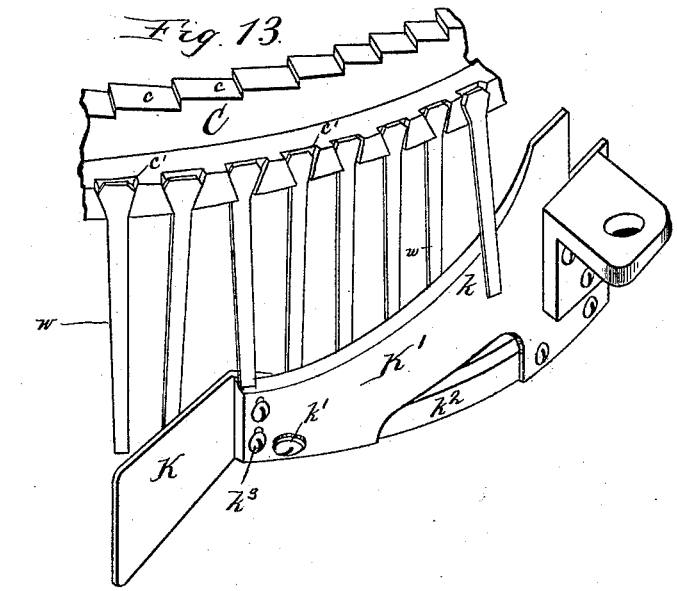
Witnesses:
Lew. E. Curtis.
Emma Stack.
Inventor:
August Holmquist.
By Munday Evarts & Adcock
His Attorneys.

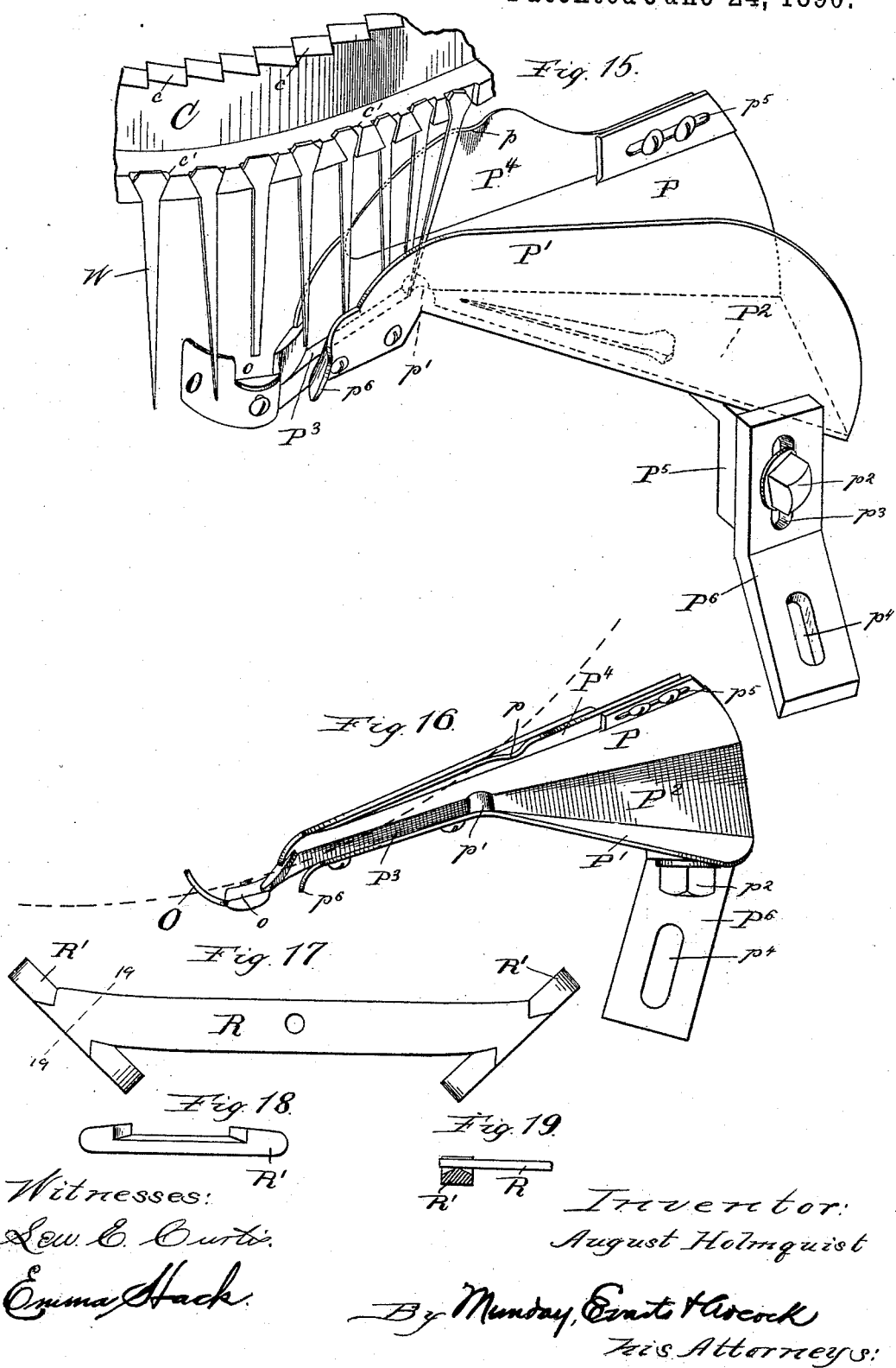

(No Model.) 7 Sheets—Sheet 7.

A. HOLMQUIST.
HORSE NAIL FINISHING MACHINE.

No. 430,736. Patented June 24, 1890.

Witnesses:
Lew. E. Curtis
Emma Hack.

Inventor:
August Holmquist
By Munday Evarts & Adcock
His Attorneys.

UNITED STATES PATENT OFFICE.

AUGUST HOLMQUIST, OF CHICAGO, ILLINOIS, ASSIGNOR TO CHARLES H. DURPHY, OF SAME PLACE.

HORSE-NAIL-FINISHING MACHINE.

SPECIFICATION forming part of Letters Patent No. 430,736, dated June 24, 1890.

Application filed July 26, 1889. Serial No. 318,772. (No model.)

*To all whom it may concern:*

Be it known that I, AUGUST HOLMQUIST, a citizen of the United States, residing in Chicago, in the county of Cook and State of Illinois, have invented a new and useful Improvement in Horse-Nail-Finishing Machines, of which the following is a specification.

This invention relates to the class of horse-nail-finishing machines of which a type is shown in the patent to Wills, No. 224,062, of February 3, 1880.

The object of the invention has been to avoid some of the difficulties heretofore experienced in this class of machines, and also to provide them with devices whereby nails which are too short will be automatically culled out or separated before they reach the pointing devices, and also with devices whereby nails which are rendered imperfect in the final operations may be separated from the perfect ones automatically.

A further object of the machine is to reduce all the nails to a uniform thickness—a feature not present in the Wills and similar machines, in which the density or hardness of the metal affects the operation of the machine in such manner that the hard nails are not compressed to the same thickness as the softer ones.

The invention consists in the novel combinations of mechanisms and devices hereinafter fully described, and by which the objects I have pointed out are accomplished.

The drawings accompanying this application and forming a part of this specification show, at Figure, 1 an elevation of my improved machine; at Fig. 2, a plan of the same; at Fig. 3, a vertical section upon the line 3 3 of Fig. 2; at Fig. 4, a detail elevation of the devices for holding the nail in position preparatory to and during the rolling operation. Fig. 5 is an enlarged section upon the line 5 5 of Fig. 4. Fig. 6 is a plan of the nail-holder operating against the shank of the nail and shown in Fig. 4. Fig. 7 is a plan of the pointing-dies, and Fig. 8 a section thereof on the line 8 8 of Fig. 7. Fig. 9 shows the wedge which supports the pointing-dies and its positioning-screw. Fig. 10 shows an adjustable bearing-block carried by the main slide and moved into position under the nail-carrier ring in juxtaposition to the pointing-dies and supporting the ring against the strain of the pointing operation. Fig. 11 is a perspective of one of the stationary bearing-blocks supporting the ring-carrier, and Fig. 12 is a horizontal section of the same. Fig. 13 is a perspective of the device for culling out the short nails prior to the final operations. Fig. 14 is a diagram showing the separating device of Fig. 13 in plan. Fig. 15 is a perspective of the nail-discharging devices, and which also act to separate the broken-pointed nails from the perfect ones. Fig. 16 is a diagram showing the discharge and separating devices of Fig. 15 in plan. Fig. 17 is a plan of the spring employed to hold down the ring nail-carrier. Fig. 18 is a side view of one of the shoes attached to said spring, and Fig. 19 is a section upon the line 19 19 of Fig. 17. Fig. 20 is a section of the slide of the machine, showing also some of the operating parts.

In said drawings, A represents the bed of the machine, supported upon suitable legs or frame-work $a$.

B is the stationary ring, secured to the bed A through the medium of posts or uprights $b$.

C is an intermittently-rotating ring fitting the interior of ring B and supported therein upon adjustable bearings located at intervals along its inner periphery. This ring acts as the nail-carrier. Said bearing-blocks consist of angle-pieces D, stationarily bolted to the bed or uprights thereon, and a movable piece D', the latter being held to the former by bolt $d$, passing through a slot $d'$ in the part D, and being raised and lowered by the screws $d^2$, threaded in the block D and acting against the offset portion $d^3$ of the part D'. To guide the part D' in its movements, the part D is provided with a vertical rib $d^4$ upon its face, against which the part D' abuts, and the latter is provided with a corresponding groove to receive said rib, as clearly illustrated at $d^5$ Fig. 12. The supporting-surface upon which the ring-carrier rests is shown at $d^5$. By means of these adjustable bearings I am enabled to elevate or lower the nail-ring carrier with great accuracy and small labor, and by this feature the machine may be quickly changed to adapt it to work with nails of different lengths.

The intermittent rotary movement of the ring-carrier, by which it is enabled to carry the nails to the various operating mechanisms, is caused by the rocking of a stationary cross-shaft J through the alternate lifting and depression of an arm J' upon said shaft riding upon the incline $J^2$ upon the carriage E and the consequent actuation of the pawl $J^3$, carried by the arm $J^4$, secured to said shaft J, said pawl meshing with the teeth $c$ upon the ring-carrier C.

E is a slide or carriage supported upon the bed and reciprocated back and forth by means of a lever E', loosely mounted upon a stationary cross-shaft F. This shaft F carries an elbow-lever, which is rocked in one direction by the cam G', mounted upon the power-driven shaft G, by contact with the arm $g$ of said elbow-lever. Said elbow-lever (shown at $G^2$) is rocked in the reverse direction by a spring-cam $G^3$, also secured upon shaft G and acting upon the lower arm $g'$ of said elbow-lever. The elbow-lever $G^2$ and the lever E' may be cast in one piece, if preferred. The contact-points of the elbow-lever bearing upon the cams G' $G^3$ are preferably provided with anti-friction rollers $g^2$, and said rollers are preferably adjustable toward the cams, so they may take up the wear from time to time, such adjustability being secured by means of the screws $g^3$ and the mounting of the journals of said rollers in slotted bearings in the arms of the elbow-lever. The spring-cam $G^3$ is formed of a bent piece of metal secured at one end to a hub $G^4$ on shaft G and at the other end resting upon said hub. It is adapted to prevent all slack or lost motion on the part of the elbow-lever, as it automatically springs sufficiently to keep in bearing-contact with the roller of arm $g'$. The construction of cam G' is clearly shown at Fig. 20, and its operation is fully set forth below.

Mounted upon shaft G is an eccentric H, whereby the rolling devices of the machine are actuated. These rolling devices consist of the pair of rollers $h\ h$, mounted in the arms of a fork-lever H', connected to the eccentric. The rollers pass between a stationary abutment $H^2$ and another abutment or block $H^3$, carried by the carriage E, the nail while being rolled being interposed between the rollers $h$ and this latter abutment. During the rolling operation the carriage E is moved back firmly against a block $H^4$, which at the proper time is interposed between the carriage E and the frame of the machine. The block $H^4$ is supported upon one end of a lever $H^5$, pivotally joined to rocking arm $H^6$, loosely mounted upon the shaft F, the other end of said arm resting upon a cam $H^7$ upon shaft G. By the operation of said cam the block $H^4$ is lowered from its acting position, and it is raised to said position by the spring $H^8$, secured to arm $H^6$ and the frame of the machine. The parts are shown at Fig. 20 in the position they occupy at the commencement of the rolling operation, the nail being present, although not shown in said figure, and it will be noticed that there is a small space between the block $H^4$ and that part of the carriage E which comes against said block.

It is perhaps well at this point in the description of the machine to detail the movements of the carriage E. Supposing the parts to be in the position shown at Fig. 20, with the cam-shaft G moving in the direction indicated by the arrow, the cam G' will first actuate the elbow-lever and carry the lever E' sufficiently to move the carriage back against the block $H^4$, in which position it remains until the rolling operation is finished. In so doing the roller of arm $g$ passes out of the depression $g^4$ of the cam and along the surface $g^5$ and enters the other depression $g^6$. The entrance of the roller within this second depression allows the carriage to be moved back through the means of the spring-cam to the position shown at Fig. 20, thereby freeing the block $H^4$, so that it can be withdrawn. The further rotation of the cam G' now brings one of its long sides $g^7$ against the arm of the elbow-lever and causes it to raise said arm, thereby vibrating the lever E' toward the pointing and beveling devices and moving the carriage over to the performance of those operations. The carriage remains in the position just noted while the end surface of the cam $g^8$ is in contact with the elbow-lever. When such contact has passed beyond the end $g^8$ and onto the side $g^9$, the elbow-lever is not actuated from the cam G', but is at liberty to be swung downward by the spring-cam, and this results in carrying the carriage back to its starting position, as shown at said Fig. 20.

At T is a movable keeper adapted to bear against the nail-blank when positioned to be rolled and press it against the abutment $H^3$ preparatory to the rolling. It is also adapted to yield to the rollers as they rise into position and follow them as they retreat, maintaining an even pressure against the nail during such movements and making the movements without hitches or catching. This function is obtained by the peculiar means by which the keeper is secured to its supporting-plate T'—viz., the confining-screw $t'$, passing through the long slot $t$, at the end of the keeper, and the pin $t^2$, secured in the keeper and working in the inclined slot $t^3$ in the plate T'. In its normal position the keeper rests on the eccentric $t^4$, and such position may be changed by rotating such eccentric.

To prevent the nails rising either during or before the rolling operation, a presser U is provided, whereby a spring-pressure is maintained upon the nail-blank until it has passed beyond the rolling devices. This presser U is provided with a shank $u$, an inclosing-barrel $u'$, and a spring $u^2$, surrounding the shank and within the barrel. A set-screw $u^3$ limits the movements of the presser. This presser is mounted upon the end of an adjustable arm U', secured to the stationary frame by the bolt $u^4$ and adjusted by the screw $u^5$, and the lower point $u^6$ of said arm U' projects below the presser and bears against the outside of the nail-head, as clearly indicated at Fig. 4; and it will be seen, therefore, that by the adjustment of the arm U' to or from the ring-carrier the bend or "set" of the nail, as it is called, is made greater or less, as desired.

After the rolling operation the carriage is reciprocated to the opposite side of the ring-carrier, and there brings the nail in contact with the pointing or shearing dies and the beveling-dies; but intermediate between the rolling and the subsequent operations the nail is carried to a separating device, whereby such of the nail-blanks as are not long enough to produce perfect nails are culled out or separated. This device is shown more particularly at Figs. 13 and 14. It consists of a deflector K and guard-plate K', the former of which is interposed in the path of the nail-blanks as they travel around with the ring-carrier and while hung in the spaces $c'$ provided for them upon the rim of said carrier and deflects the nails inwardly from the perpendicular plane. Immediately following the deflector K is the guard-plate K', behind which the nails pass from said deflector; but said plate at its initial end is sufficiently removed from the path of the nails to incline them to such an extent as will allow the too-short blanks to swing back to a perpendicular position. By this swinging back the points of the short blanks are carried to the outside of said plate, and they are discharged from the carrier by said plate at the point $k$ and fall through an opening $K^5$ in the stationary ring. In the meantime such of the nail-blanks as are of proper length and too long to swing over the plate continue to pass along the interior side of said plate until they have passed beyond this sorting device and remain on the carrier unaffected in any manner beyond the temporary deflection from the perpendicular line by said sorting device. The deflector and plate can be adjusted to and from the line of travel of the nail-blanks (indicated by the broken line in Fig. 14) by means of the screw $k'$, passing through the plate into a supporting-piece $k^2$. The deflector may also be adjusted vertically to suit nails of different length by the screws $k^3$, which hold it to the plate K'. By means of this sorting device all those blanks which have not sufficient length to form perfect nails of the size being finished are discharged from the machine automatically. From this sorting device the nails next come to the shearing or pointing devices. These consist of the knives L L, mounted in a holding-block L', adjusted by the screws $L^2$, bearing against their rear ends and clamped upon the interposed wedge $L^3$, placed between them, by set-screws $L^4$. These knives are of the ordinary construction; but the wedge is differently supported from the wedge of previous machines. This difference is found in the securing of said wedge upon the end of a non-rotating screw $L^5$, having a dovetail head fitting a dovetail slot in the wedge. Said screw is moved in or out by the nut $L^6$ working in the opening between the limbs $L^9$ of forked bracket $L^8$, attached to the block L', and when once adjusted by this screw the wedge may be removed or slipped off the screw-head and replaced without destroying the adjustment. A large amount of care has heretofore been requisite in positioning the wedge after each withdrawal of the knives; but this necessity is obviated by this feature of improvement. The block in which the knives are supported is mounted upon and carried by the carriage E, and it moves the knives up to and against an opposing or countering blade $L^7$, stationarily supported upon the frame of the machine. To position the nail properly preparatory to the shearing of the point, a centering device M, mounted upon a swinging arm $m$, is employed. This arm is pivoted to a stationary support at $m'$, and a spring $m^2$ acts upon it at all times and forces it toward the nail. The point of the centering device comes in contact with the nail shortly in advance of the knives, and as the carriage moves up toward the stationary knife the centering device yields to the extent required, the spring $m^2$ collapsing for this purpose. From this pointing mechanism the nail next passes to and is operated upon by a die N, carried upon the carriage E, and an opposing stationary die N'. These dies are intended to impart to the nail a final or finishing bevel at the point. The now-completed nails are further assorted by passing them to a second assorter before their final discharge from the machine. This second sorting device is provided with a deflector O, which extends across the path of the nails and swings them outwardly, and which is cut away at $o$ sufficiently to allow such of the nails as have been shortened in the finishing operations to swing back to their normal plane. The nails which are thus permitted to resume their normal position pass to the rear of the discharge-chute instead of entering the same, and they thus continue along with the carriage until they reach the point where the nails are inserted therein by the operator and by whom they are removed. The presence of an imperfect nail upon the carriage beyond the discharge-chute is a warning to the attendant that the pointing-dies are dull or not performing their duty properly. The perfect nails continue to move along the outside of the deflector O beyond the cut-away point $o$, and thus enter the discharge chute or passage, which may be formed by the interior wall P, an exterior wall P', and a floor $P^2$ $P^3$. At $P^4$ is a guide, preferably adjustable, attached to the wall of the chute and provided with an outward projection or bend $p$. That portion of the floor of the chute marked P³ is preferably inclined upward, so it may act to lift the nails slightly and loosen them in the ring-sockets in which they are carried. As the points of the nails reach the end of this incline P³ they encounter the rise $p'$, by which they are momentarily detained and inclined, as indicated at Fig. 15, and while in this position the nails are thrown out of the ring-carrier by the bend $p$ and caused to fall with their heads downward, thus avoiding dulling or other injury to the points.

The chute and deflector (the latter being carried by the former) are preferably made adjustable, as they may need to be raised or lowered to suit different lengths of nails, and hence I provide for this adjustment in the supporting-bracket by which the chute is sustained. This bracket may be made in two parts, each L-shaped, as at P⁵ P⁶, the former movably secured to the latter by a bolt $p^2$, passing through the slot $p^3$. The bracket is secured to a stationary part of the machine by a bolt passing through slot $p^4$, such slot allowing the chute to be moved toward or away from the ring-carrier and also to be swung on the fastening-bolt. The guide P⁴ may need to be moved longitudinally to bring the bend $p$ nearer to or away from the rise $p'$, and hence I provide the slots $p^5$ for its holding-screws. A guard $p^6$ may be employed to insure the entrance of the nails in the chute.

R is the spring employed to hold the nail-carrier down upon its ways. I provide it with rocking shoes R' at each end, such shoes being adapted to rest upon the ratchet-teeth of the carrier without injury to such teeth, and in order that the shoes may at all times conform to the surface upon which they bear I give them liberty to rock, as will be understood from Fig. 19. The ends of the shoes, it will also be noticed, are rounded, so they will not engage with the teeth.

S and S' are blocks having inclined meeting surfaces and are secured together as shown in Fig. 10. Being adjustable one upon the other, the block S' is readily raised or lowered, as will be understood. These blocks are borne upon the carriage E, and are so placed upon the carriage that they come under the ring-carrier in juxtaposition to the pointing devices at the time the latter are operating, so that the strain caused by the pointing may be borne upon said blocks S S'.

V is a spring attached to the upper side of the strap of the eccentric H, and acting to keep the lever H' in its proper position, so as to avoid interference with the nails as they enter between the rollers and abutment H³.

W, wherever it appears, represents the finished nails, and $w$ the blanks or unfinished nails.

It will be noticed that the movable abutment of the rolling mechanism and the slide or carriage upon which it is mounted are moved back positively against the stop-block H⁴ prior to the commencement of the rolling operation, so that the position of said abutment is always the same during those operations, and thus insures the rolling of all the nails to a uniform thickness. This is a feature of great importance in this class of machines, and it differs from the Wills machine, wherein the movement of the carriage against the stop-block depends upon the hardness of the metal of which the nail is composed, a hard nail forcing it to a greater distance than a soft one, and thus causing the production of nails of varying thicknesses.

I claim—

1. The combination, with the movable abutment of the rolling mechanism of a horse-nail-finishing machine and the slide upon which the abutment is carried, of a stop-block interposed behind the slide during the rolling operation and mechanism for moving the slide positively and solidly against said block, substantially as set forth.

2. The combination, with the abutment H³, the slide carrying said abutment, the opposing stationary abutment, and the rollers, of the block H⁴, acting as a stop to said slide and mechanism for positively moving said slide against said block, substantially as set forth.

3. The combination, with the ring nail-carrier and rolling mechanism, of a deflector K, crossing the path of the nail-blanks and deflecting them from the perpendicular plane, and a guard-plate K', located beyond the deflector and acting both to separate the short blanks from the full-length ones and to discharge the short ones, and also adapted to allow the short blanks to swing back to the perpendicular plane, said deflector and plate having a depression or space through which the shorter nails may return to their normal position, substantially as set forth.

4. The combination, in a horse-nail-finishing machine, of a nail-finishing mechanism, and a sorting device adapted to separate the perfect finished nails from the imperfect ones, with a single nail-carrier which carries the nails to the finishing mechanism and from said mechanism to said sorting device without any intermediate handling, substantially as set forth.

5. The combination, with the nail-carrier of a horse-nail-finishing machine, of a device for assorting the finished nails, consisting of a deflector extending outwardly across the path of the nails, and having a cut-away portion which allows the short nails to swing back to their normal plane, and a discharge-chute into which the perfect nails pass from said deflector, substantially as set forth.

6. The combination, with the ring nail-carrier, of a deflector O, having cut-away portion $o$, and a discharge-chute the wall whereof is provided with a projection or bend adapted to throw the nails out of the carrier, substantially as set forth.

7. The combination, with the ring nail-carrier, of a discharge-chute having a bend $p$, adapted to throw the nail out of the carrier, and a rise $p'$, adapted to incline the nail at the time it is thrown out, substantially as set forth.

8. The combination, with a horse-nail-finishing machine, of a separating device for culling out the blanks which prove to be too short after being rolled and a second separating device for culling out the nails which are shortened in the finishing operations, substantially as set forth.

9. In the pointing mechanism of a horse-nail-finishing machine, the combination, with the knives L L, of the wedge $L^3$, having an adjusting-screw let into it and from which it is removable, substantially as set forth.

10. In the pointing mechanism of a horse-nail-finishing machine, the combination, with the knives, of the wedge $L^3$, dovetailed upon the end of its supporting-screw $L^5$, substantially as set forth.

11. In the pointing mechanism of a horse-nail-finishing machine, the combination of the knives L L and the interposed wedge $L^3$, both the knives and the wedge having independent adjusting-screws, substantially as set forth.

12. In the pointing mechanism of a horse-nail-finishing machine, the combination, with the wedge, of the non-rotating adjusting-screw dovetailed in the wedge and the forked bracket confining the nut of the adjusting-screw, substantially as set forth.

13. In a horse-nail-finishing machine, a ring nail-carrier supported upon adjustable bearing-blocks, substantially as set forth.

14. The combination, with the ring nail-carrier, of the two-part adjustable bearing-blocks D and D', one part being adjustable upon the other, substantially as set forth.

15. The combination, with the carriage, of the spring-cam and connecting mechanism for carrying motion from said cam to said carriage, substantially as set forth.

16. The combination, with the carriage, of cam G' and spring-cam $G^3$ and connecting mechanism between said carriage and cams, substantially as set forth.

17. The combination, with the carriage, of cam G', having depressions $g^4$ $g^6$, and connecting mechanism between said carriage and said cam, substantially as set forth.

18. The combination, with the carriage and levers E' and $G^2$, of cam G', the latter being constructed, as shown, with depressions $g^4 g^6$, and means for reversing said carriage when the lever $G^2$ enters such depressions, substantially as set forth.

19. The combination, with the carriage, of cam G', having depressions $g^4$ $g^6$, spring-cam $G^3$, elbow-lever $G^2$, and lever E', substantially as set forth.

20. The combination, with the cams G' and $G^3$, of the elbow-lever having adjustable rollers bearing upon said cams, substantially as set forth.

21. The combination, with cam G' and the elbow-lever, of a spring-cam $G^3$, substantially as set forth.

22. In a horse-nail-finishing machine, a movable keeper T, secured to its supporting-plate by means substantially such as set forth.

23. The keeper T, having slot $t$ and pin $t^2$, in combination with plate T', having slot $t^3$, and the confining-screw $t'$, substantially as set forth.

24. The keeper T and the means for movably securing it to its supporting-plate, in combination with said plate and the eccentric $t^4$, substantially as set forth.

25. In a horse-nail-finishing machine, a spring-presser U, having an inclosing-barrel, a spring, and a regulating-screw, substantially as set forth.

26. In a horse-nail-finishing machine, a presser bearing against the side of the nail-head and adjustable to and from the nail-carrier, substantially as set forth.

27. The centering device M, mounted upon swinging arm $m$, in combination with said arm, the support $m'$, and the spring $m^2$, substantially as set forth.

28. In a horse-nail-finishing machine, devices for discharging the finished nails, provided with means for reversing the nails, whereby it is adapted to discharge them head downward, substantially as specified.

29. In a horse-nail-finishing machine, the combination, with the nail-carrier, of an assorting device acting to separate the imperfect from the perfect finished nails and a discharge-chute upon which the assorting device is mounted, said chute being adjustably supported, substantially as set forth.

30. In a horse-nail-finishing machine, the combination, with the nail-carrier, of a discharge-chute having an adjustable guide $P^4$, substantially as set forth.

31. The discharge-chute having the upwardly-inclined floor $P^3$, the rise $p'$, and the discharging-point $p$, in combination with the nail-carrier, substantially as set forth.

32. The combination, with the nail-carrier, of the discharge-chute having the rise $p'$ and the discharging projection or bend $p$, the latter being adjustable relative to said rise, substantially as set forth.

33. The combination, with the ring-carrier, of the spring R, provided with rocking shoes R' at its ends, substantially as set forth.

34. The combination, with the ring-carrier and the pointing mechanism, of the adjustable support S S' and the carriage E, substantially as set forth.

AUGUST HOLMQUIST.

Witnesses:
EDW. S. EVARTS,
LEW. E. CURTIS.